US009544284B1

(12) United States Patent
Dooley et al.

(10) Patent No.: US 9,544,284 B1
(45) Date of Patent: Jan. 10, 2017

(54) SECURE DATA EXCHANGE TECHNIQUE

(71) Applicants: Daniel A Dooley, Hull, GA (US); Peter M. Rice, Athens, GA (US)

(72) Inventors: Daniel A Dooley, Hull, GA (US); Peter M. Rice, Athens, GA (US)

( * ) Notice: Subject to any disclaimer, the term of this patent is extended or adjusted under 35 U.S.C. 154(b) by 588 days.

(21) Appl. No.: 13/874,476

(22) Filed: Apr. 30, 2013

Related U.S. Application Data

(63) Continuation-in-part of application No. 13/560,528, filed on Jul. 27, 2012, now Pat. No. 9,378,026.

(51) Int. Cl.
*H04L 29/06* (2006.01)
*G06Q 20/10* (2012.01)
*H04L 9/00* (2006.01)

(52) U.S. Cl.
CPC ............ *H04L 63/08* (2013.01); *G06Q 20/10* (2013.01); *H04L 9/00* (2013.01)

(58) Field of Classification Search
None
See application file for complete search history.

(56) References Cited

U.S. PATENT DOCUMENTS

| 6,185,683 | B1 * | 2/2001 | Ginter | G06F 21/10 348/E5.006 |
|---|---|---|---|---|
| 6,314,468 | B1 * | 11/2001 | Murphy | H04L 63/0428 709/217 |
| 7,143,290 | B1 * | 11/2006 | Ginter | G06F 21/6209 348/E5.006 |
| 8,897,820 | B2 * | 11/2014 | Marovets | H04W 4/14 455/418 |
| 2002/0026321 | A1 * | 2/2002 | Faris | A63F 13/12 705/1.1 |
| 2005/0257193 | A1 * | 11/2005 | Falk | G06F 8/315 717/109 |
| 2005/0262130 | A1 * | 11/2005 | Mohan | G06F 17/2725 |
| 2006/0206838 | A1 * | 9/2006 | Gottfurcht | G06F 3/0238 715/854 |
| 2006/0248009 | A1 * | 11/2006 | Hicks | G06Q 20/00 705/40 |
| 2008/0071887 | A1 * | 3/2008 | Gaurav | G06F 17/3092 709/220 |
| 2010/0281072 | A1 * | 11/2010 | Cicman | G06F 17/30914 707/803 |

\* cited by examiner

*Primary Examiner* — Ninos Donabed
(74) *Attorney, Agent, or Firm* — Smith Tempel Blaha LLC; Gregory Scott Smith

(57) ABSTRACT

A technique for the secure exchange of data between multiple entities that use compatible business management systems utilizes serializable data transfer objects to transfer business data over a secure communication path. These serializable data transfer objects are used to share business data over a secure communication path, eliminating the need for an active user connection between entities wishing to exchange data. The data contained within the transfer objects can be used by any participating entity to update existing records related to the transaction, or to create new records relating to the transaction. Serializable objects link all data relating to a given business transaction. An interface allows users to view data contained in or referenced by an object, and to create or modify transaction records based on the data.

10 Claims, 8 Drawing Sheets

SECURE DATA EXCHANGE TECHNIQUE

CROSS-REFERENCE TO RELATED APPLICATIONS

This is a utility patent application being filed in the United States Patent and Trademark Office as a non-provisional application for patent under Title 35 U.S.C. §100 et seq. and 37 C.F.R. §1.53(b) and, is a continuation-in-part of the U.S. patent application Ser. No. 13/560,528 that was filed on Jul. 27, 2012, which application is incorporated herein by reference in its entirety.

BACKGROUND

Electronic data interchange (EDI) between businesses has become so common that it is easy to forget about the many small businesses that cannot afford to implement it. The road to data integration for small businesses is full of obstacles, any of which can derail efforts at data integration. One is the cost of conversion software, conversion services, or both. Additionally, the purchase of new software can require the company to update or replace some or all of its hardware. Another obstacle to data integration for small businesses is that many small businesses do not have dedicated IT employees with the knowledge or expertise to handle a data integration project. Another obstacle is the preparation and training for the new technology, which can be so disruptive to the daily operations of a small business that current revenue and customer relationships can be adversely affected. Obstacles like these as well as others, even if only perceived, can make small business owners very reluctant to undertake data conversion projects, regardless of how affordable or seamless their implementation might actually be.

Many small businesses use popular "off-the-shelf" business management systems because they are affordable and relatively easy to use. Ironically, businesses that use the same business management system still have to undergo the process of data conversion if they want to exchange data with each other, even though the programming structure of their respective business management systems is nearly identical.

There is a need to facilitate the secure exchange of electronic data between businesses that have compatible business management systems.

BRIEF SUMMARY

The present disclosure presents a novel technique for securely exchanging electronic data between multiple entities that share a common accounting link and that utilize the same business management system, without compromising the confidential or otherwise unauthorized data of any of the entities. In general, the technique utilizes data transfer objects that can be serialized. The serialized data transfer objects are used to share business data over a secure communication path, eliminating the need for an active user connection between entities wishing to exchange data. The data contained within the transfer objects can be used by any participating entity to update existing records related to the transaction, or to create new records relating to the transaction. Security of business data between the participating entities is maintained both because there is no remote user connection between any of the participating entities, and because the participating entities have the option of accepting or not accepting the data being exchanged into their business management systems. In addition, a comprehensive audit trail of records relating to the transaction is created.

The secure data exchange technique can be utilized in a variety of business settings and computing environments. As a non-limiting example, it can be part of a web-based or web-centric accounting and general ledger system in a client-server configuration. One implementation of the technique contains a user interface in the client module that sends information to the server and receives information requests from the server, and a server module that receives information requests from the client and sends information to the client. Data relating to a business transaction to be exchanged is organized into a serializable transfer object, which is then transmitted over a secure communication path to the other participating entity or entities. The data contained in the transfer object can be accessed by users of the participating entities and used to update their own existing records relating to the transaction, or create a new record relating to the transaction. Because the transfer object is serializable, whenever any of the participating entities creates a new record or modifies an existing record relating to the transaction, the transfer object is modified with the data contained in the new or modified record. The result is that the transfer object contains and maintains a comprehensive documentation "chain" of all the data relating to a business transaction that can be accessed by any of the entities participating in the transaction.

In general, embodiments of the secure data exchange technique operate to share business data related to a given transaction between participating entities by using data transfer objects to link the data contained in the business records of each participating entity.

These embodiments, features, and aspects are further described in the following detailed description and the figures.

DETAILED DESCRIPTION OF EMBODIMENTS OF THE INVENTION

This description is related to and is directed towards a technique to provide for the secure exchange of electronic data between multiple entities that use the same business management system and that have a common accounting link. The various embodiments of the secure data exchange technique described herein utilize the non-limiting example of a business transaction conducted between two participating entities—Company A and Company B. Company A orders widgets from Company B, which establishes their common accounting link. Both companies use the same business management system and have agreed to use the technique to exchange data with each other relevant to their business transactions. It should be understood that the reference of "the same business management system" may include a single shared system, however, the term is not limited to such a configuration and in fact may include multiple and distributed systems that are running or implementing a compatible business management system. The compatibility may include running identical software applications, containing identical hardware, including capabilities to communicate over a common protocol, sharing file databases, and/or the like as a few non-limiting examples. In general, each such business management system is capable of establishing a secure communication path, such as by utilizing HTTPS and a public/private encryption key system as a non-limiting example, which will provide encrypted communication and secure identification of a network web server.

Figure 1:
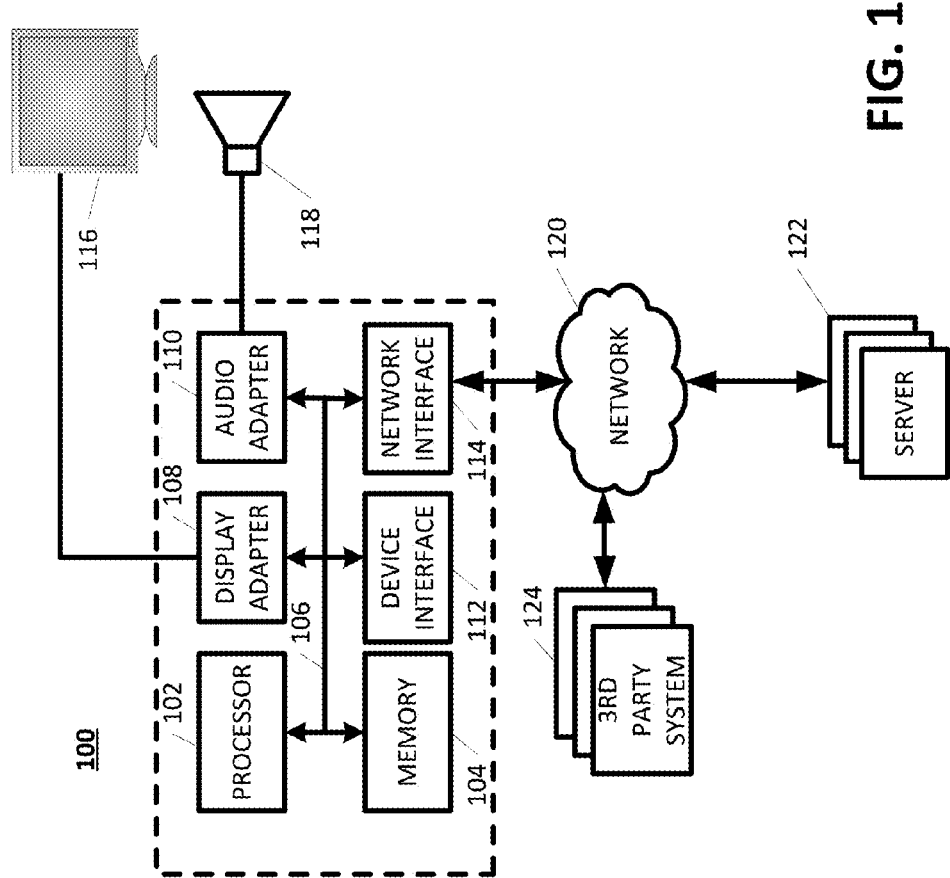
FIG. 1 is a functional block diagram of the components of an exemplary environment or platform in which the secure data exchange technique can be implemented or an application, module or routine utilizing the secure data exchange technique can be implemented.

FIG. 1 is a functional block diagram of the components of an exemplary environment or platform in which various embodiments of the secure data transfer technique can be implemented, or an application, module, component or routine utilizing the technique can be implemented. It will be appreciated that not all of the components illustrated in FIG. 1 are required in all embodiments or implementations of the technique, but each of the components are presented and described in conjunction with FIG. 1 to provide a complete and overall understanding of the components. In addition, it will be appreciated that the embodiments of the technique may be implemented in systems and/or environments that may include other components and functionality and as such, the illustrated configuration is simply a non-limiting example.

The exemplary platform 100 is illustrated as including a processor 102 and a memory element 104. In some embodiments, the processor 102 and the memory element 104 may be communicatively coupled over a bus or similar interface 106. In other embodiments, the processor 102 and the memory element 104 may be fully or partially integrated with each other. The processor 102 can be a variety of processor types including microprocessors, micro-controllers, programmable arrays, custom IC's etc., and may also include single or multiple processors with or without accelerators or the like. The memory element of 104 may include a variety of structures, including but not limited to RAM, ROM, magnetic media, optical media, bubble memory, FLASH memory, EPROM, EEPROM, etc. In addition, rather than being internal to the platform 100, the memory element 104 may be external to the platform 100 and accessed through a device interface 112 or network interface 114. The processor 102, or other components may also provide sub-components or functionality such as a real-time clock, analog to digital convertor, digital to analog convertor, sensors, etc. The processor 102 also interfaces to a variety of elements including a control/device interface 112, a display adapter 108, audio adapter 110 and a network/device interface 114. The control/device interface 112 provides an interface to external devices, systems, equipment, sensor, actuators or the like. As non-limiting examples, the control/device interface 112 can be used to interface with devices or systems such as a keyboard, a mouse, a pin pad, and audio activate device, a PS3 or other game controller, as well as a variety of the many other available input and output devices or, another computer or processing device. The display adapter 108 can be used to drive a variety of visually oriented elements 116, such as display devices including an LED display, LCD display, one or more LEDs or other display devices, printers, etc. The audio adapter 110 interfaces to and drives a variety of audible or other alert elements 118, such as a speaker, a speaker system, buzzer, bell, vibrator, etc. The network/device interface 114 can also be used to interface the computing platform 100 to other devices or systems through a network 120. The network may be a local network, a wide area network, wireless network (WIFI, Bluetooth, cellular, 3G, etc.), a global network such as the Internet, or any of a variety of other configurations including hybrids, etc. The network/device interface 114 may be a wired interface or a wireless interface. The computing platform 100 is shown as interfacing to a server 122 and a third party system 124 through the network 120. Thus, the computing platform can function independently, in connection with one or more systems, or even as a distributed system. A battery or power source provides power for the computing platform 100.

Figure 2:
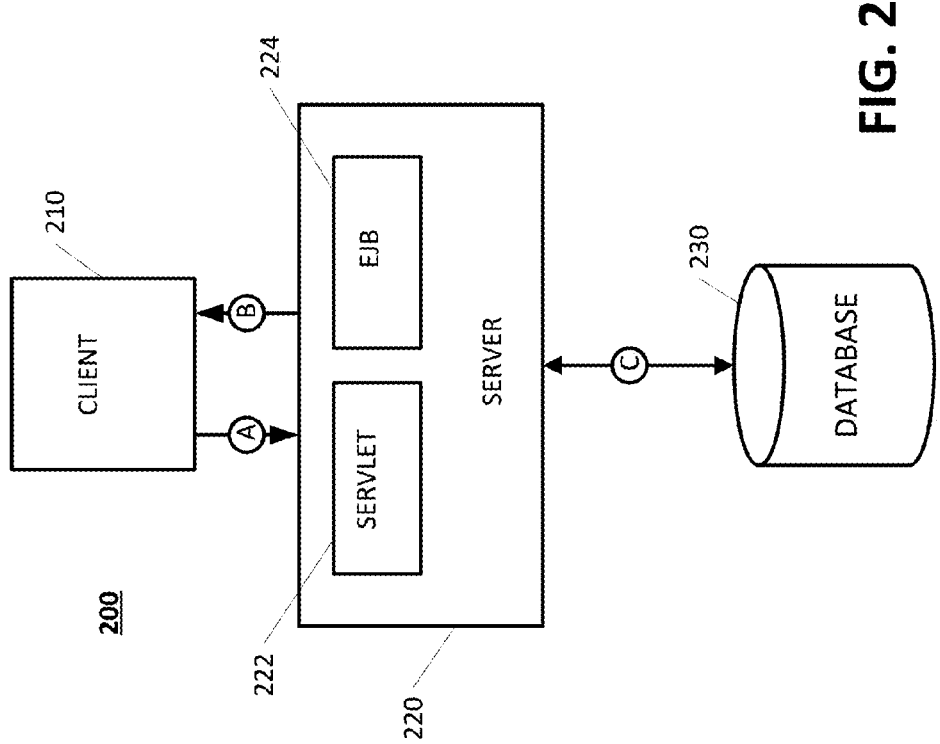
FIG. 2 is a functional block diagram illustrating non-limiting example of a functional environment in which the secure data exchange technique can be implemented.

FIG. 2 is a functional block diagram illustrating non-limiting example of a functional environment in which the secure data exchange technique can be implemented. Thus, although the various functions are illustrated as being divided into various blocks, it will be appreciated that some of the functions may be implemented within common hardware, firmware and/or software components and/or various functions may actually exist among two or more separate hardware, firmware and/or software components. The environment illustrated in FIG. 2 is a client-server application environment 200. The client-server application environment is shown as including, but not limited to, the components of an application client 210, a server 220 and a database 230. The application client 210 communicates information to the server 220 over communication path A and receives communicated information from the server 220 over communication path B. A protocol such as HTTPS may be used to provide data privacy for information that is communicated between the application client 210 and the server 220 and enforces client authentication to limit access to the server 220 to authorized users. It will be appreciated by one of ordinary skill in the relevant art that the secure data exchange technique could be incorporated into any local or distributed computing environment and the illustrated example is just provided for purposes of explanation.

Figure 3:
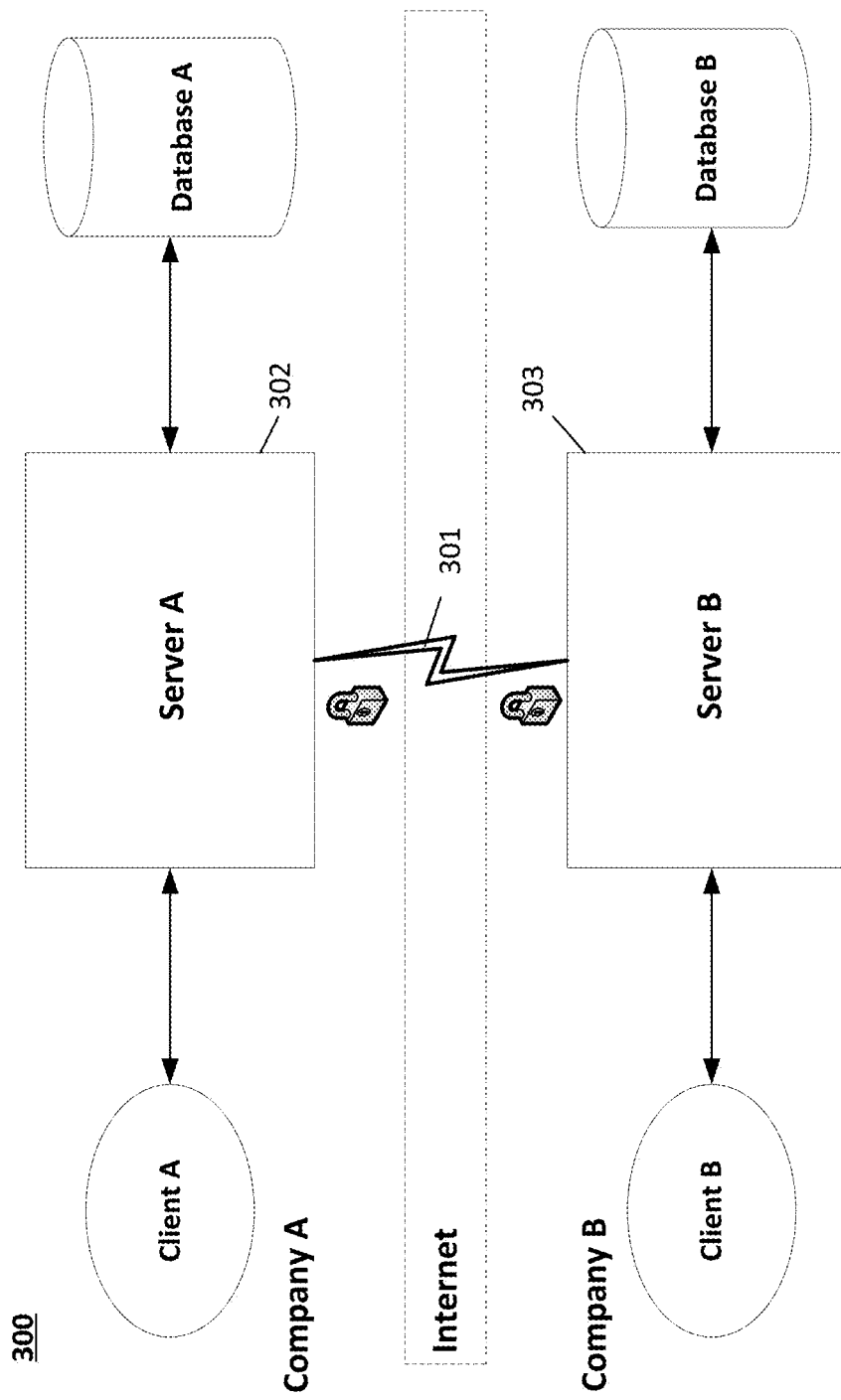
FIG. 3 is a block diagram illustrating the use of a secure communication path between participating entities implementing an exemplary embodiment of the secure data exchange technique.

It will be appreciated that the computing platform 200 illustrated in FIG. 2, may then provide an environment on which an application, program, system, etc. can run, and that such application, program, system, etc., may incorporate aspects of the technique or access an external function or system that houses an embodiment of the secure data exchange technique. Likewise, the computing platform 100 may also illustrate a platform in which a standalone embodiment of the technique may reside, such as a smart phone, tablet computer, lap top computer, desktop computer, etc. In addition, the computing platform 100 may illustrate a platform in which various components of the system may be implemented. For example, the client 210, the server 220 and the database 230 may each be implemented on a single platform 100 or multiple platforms 100. FIG. 3 is a block diagram illustrating the use of a secure communication path between participating entities implementing an exemplary embodiment of the secure data exchange technique. A protocol such as HTTPS can be utilized as a non-limiting example of a secure communication path. HTTPS, which is an acronym for Hypertext Transfer Protocol over SSL, is a protocol utilizing TCP to transfer hypertext requests and information between servers and other servers, and between servers and browsers. The use of this protocol provides encrypted communication and secure identification of a network web server. HTTPS connections are used in many situations in which sensitive information is being communicated. For instance, HTTPS is frequently used for payment transactions on the World Wide Web, as well as other connections in which sensitive information may be communicated. The detailed operation of HTTPS and the involvement between the various communication network layers is not addressed in detail in this description, as those of ordinary skill in the relevant art will be familiar with the technical aspects of HTTPS. As such, only a high-level overview of the technology is presented. HTTPS provides data privacy for information that is communicated between entities utilizing the application being described. For purposes of this description, FIG. 3 illustrates a secure communication path 301 between the Server A 302 of participating entity Company A and the Server B 303 of participating entity Company B.

Use of SSL server authentication allows a user to confirm a server's identity. An application that incorporates SSL-enabled software can use standard techniques of public-key cryptography to check that a server's certificate and public ID are valid and have been issued by a trusted certificate authority. Such confirmation is important—if the servers will be transmitting confidential information over the connection, the identity of the receiver should be validated prior to the transmission of the information.

It should be appreciated that the communication path between the server and client of a given entity (i.e., Server A and Client A) may be secured using HTTPS or other techniques, and that may or may not involve accessing the internet.

It should be appreciated that other techniques can be used to provide the secured transmission of data and client/server communication and authentication, and that the use of HTTPS is only one non-limiting example. For instance, closed networks, closed communication channels, static signing, manual encryption, VPNs, etc. could also be utilized.

Figure 4:
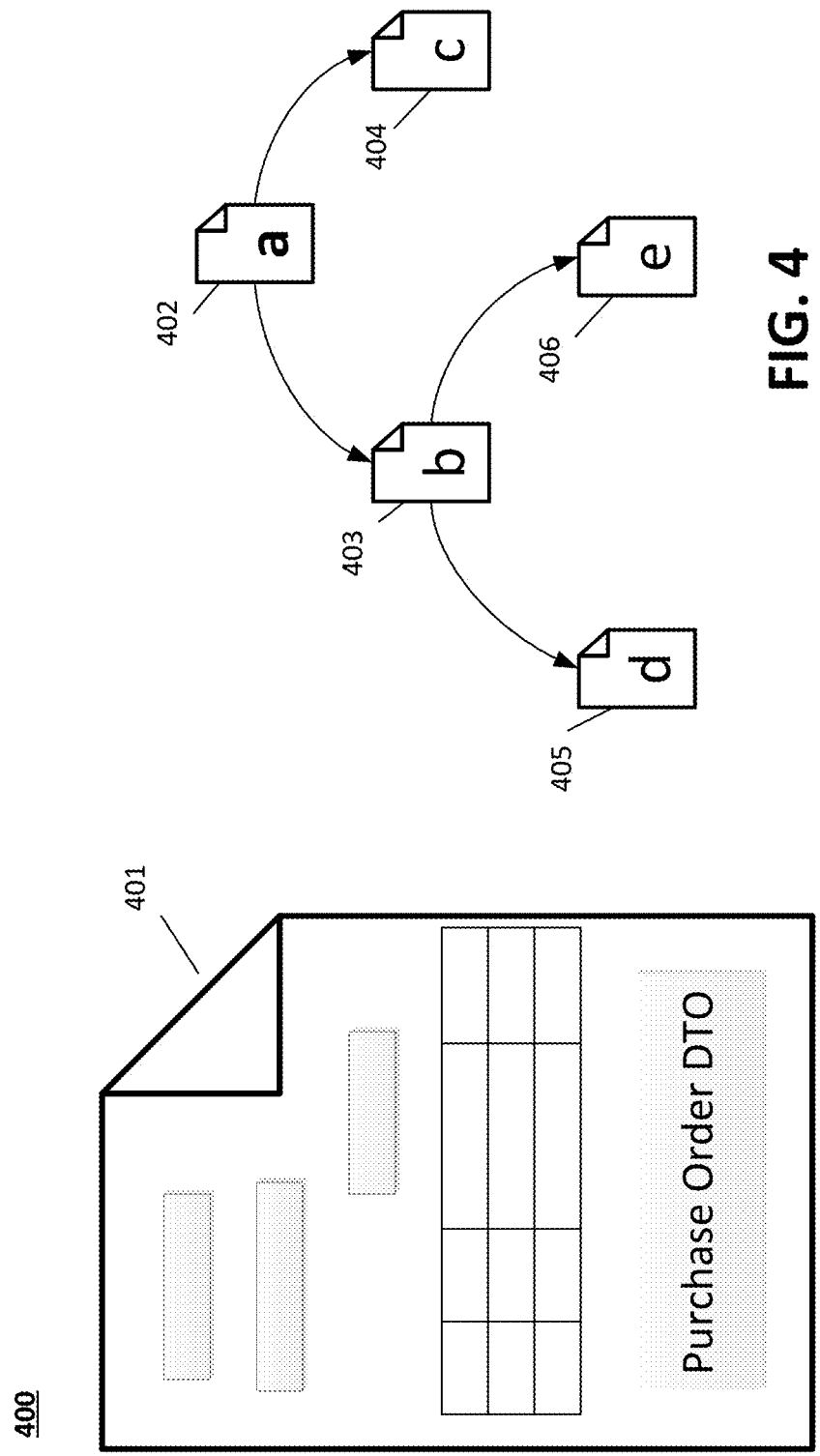
FIG. 4 is a conceptual diagram illustrating exemplary components of an exemplary data object.

FIG. 4 is a conceptual diagram illustrating exemplary components of an exemplary data object. Object-oriented programs are based on the concept of objects that interact with each other, unlike more conventional programming methods that view a program as essentially a list of tasks to be performed. The details of object-oriented programming and the interaction between data objects and other processing functions or routines is not explained here, as those of ordinary skill in the relevant art will be familiar with the technical aspects of object-oriented programming. For the purposes of this application, an object is a self-contained piece of programming code that combines data and the processing instructions needed to manipulate it. If an object also includes the code and processing instructions needed to carry data from one location (or processing step) to another, it can be referred to as a data transfer object (DTO). As a non-limiting example, DTO 401 contains the data relating to a purchase order, the processing instructions needed to manipulate said data, and the processing instructions needed to carry said data from one location (or processing step) to another.

Objects can refer to other objects. As another non-limiting example, DTO 402 (*a*) references objects 403 (*b*) and 404 (*c*). In turn, object 403 (*b*) refers to objects 405 (*d*) and 406 (*e*). It should be appreciated that objects can reference other objects, regardless of whether or not any of the objects involved are DTOs. Any or all of the objects 402, 403, 404, 405, and 406 can be a data transfer object (DTO). In an exemplary embodiment of the secure data exchange technique, data relating to a given business transaction is encapsulated into a DTO that can be transmitted from the business management system of one participating entity to those of other participating entities.

It should be appreciated that a DTO is not a remote user connection between participating entities, nor does a DTO require a remote user connection to be transmitted between participating entities.

Figure 5:
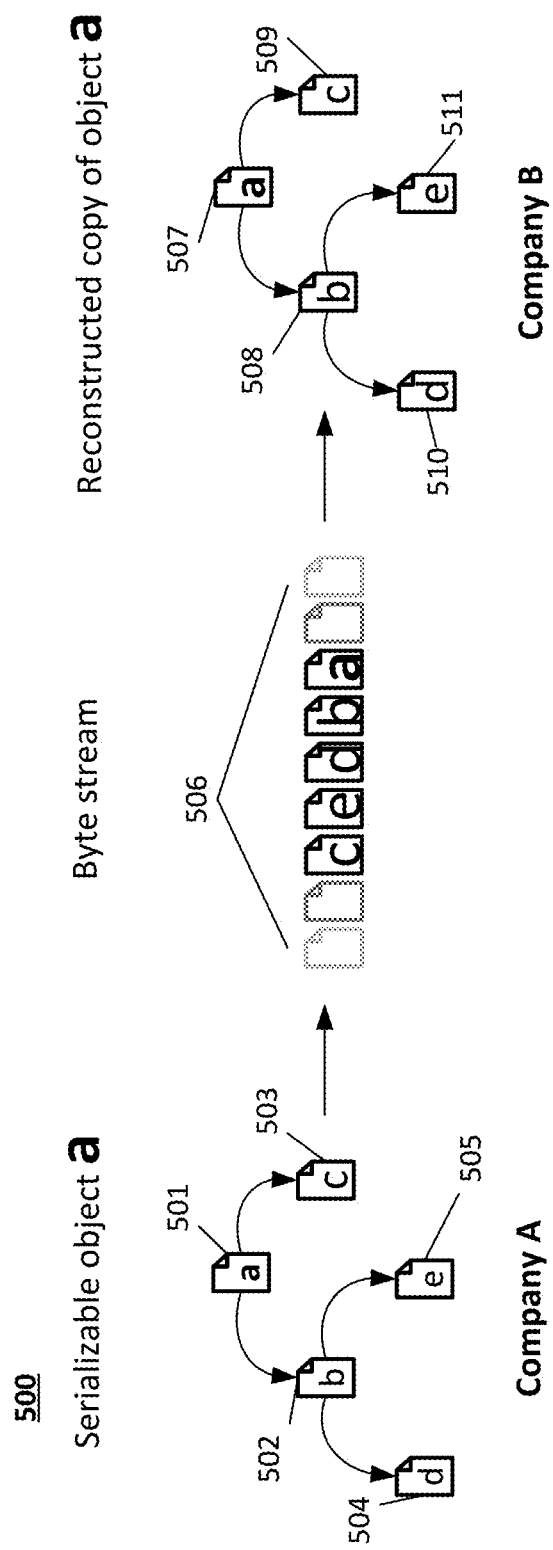
FIG. 5 is a conceptual diagram illustrating the concept of object serialization.

FIG. 5 is a conceptual diagram illustrating the concept of object serialization. More particularly, FIG. 5 depicts the concepts of serializable data transfer objects, the byte streams of serializable data transfer objects, and reconstruction of serializable transfer objects In an exemplary embodiment of the secure data exchange technique, the DTO of a given business transaction is made serializable so it functions as a comprehensive "diary" of that transaction. A serializable DTO is converted into a byte stream that preserves the DTO exactly—the stream includes all the DTO's data and all references to other objects needed to reconstruct the DTO at another time, or even another place. As a non-limiting example, serializable DTO 501 references objects 502 and 503. Object 502, in turn, references objects 504 and 505. DTO (*a*) 501, containing all its references is converted into byte stream 506. This allows DTO (*a*) 501 to be reconstructed, complete with all its references, at another time or location. DTO (*a*) 507 represents a reconstructed copy of DTO (*a*) 501. Object (*b*) 508 corresponds with object 502 (*b*), object (*c*) 509 with object (*c*) 503, object (*d*) 510 with object (*d*) 504, and object (*e*) 511 with object (*e*) 505.

The descriptions of exemplary embodiments of the secure data exchange technique utilize the non-limiting example of a business transaction conducted between two participating entities—Company A and Company B. Company A orders widgets from Company B, which establishes their common accounting link. Both companies use the same business management system and have agreed to use the secure data exchange technique to exchange data with each other relevant to their business transactions. As such, each has established a secure communication path utilizing HTTPS and a public/private encryption key system, which provides encrypted communication and secure identification of a network web server.

Figure 6:
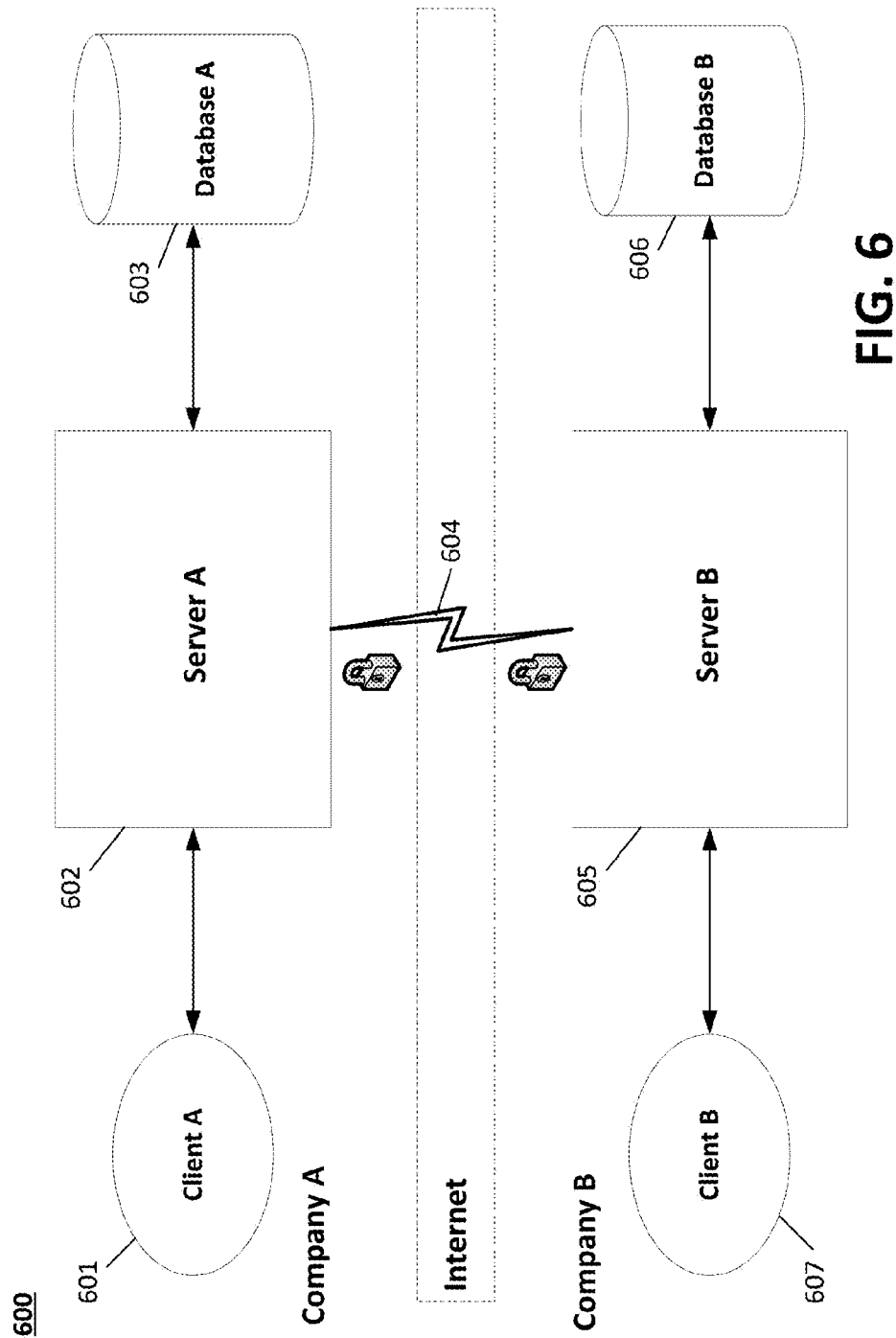
FIG. 6 is a block diagram illustrating a non-limiting example of the business management systems of participating entities Company A and Company B, and the secure communication path between the two entities.

FIG. 6 is a block diagram illustrating a non-limiting example of the business management systems of participating entities Company A and Company B, and the secure communication path between the two entities. In the illustrated embodiment, the business management system may be a web-based or web-centric accounting and general ledger system in a client-server configuration.

A user in Company A initiates a business transaction by creating a record—for example, a Purchase Order for ten steel widgets—in a client module associated with Client A 601 and transmits it to Server A 602, which saves the record in Database A 603. Server A 602 then encapsulates the data contained in the record into a serializable DTO, encrypts it, then transfers it over secure path 604 to Company B's Server B 605, where it is decrypted and saved in Database B 606.

Entities utilizing this illustrated embodiment can easily create new records based on the data contained in a DTO. Via Client B 607, a user in Company B sees that Company A has sent a DTO, and creates a Sales Order in Client B 607 with data from Company A's DTO. The system populates the data from the DTO into the appropriate fields of the Sales Order. The user enters any additional information needed regarding the order and transmits it from Client B 607 to Server B 605, which saves the record to Database B 606 and modifies the DTO to include the data from the Sales Order. In this way, all the records associated with a transaction are linked by the DTO. Server B 605 encrypts and transfers the DTO over secure path 604 to Server A 602, which decrypts it and stores it in Database A 603.

It should be appreciated that the above description explains the basic steps for creating and modifying a DTO using an exemplary embodiment of the secure data exchange technique being described. Any addition, deletion, or modification of data linked to a DTO modifies the DTO, and the newly modified DTO is automatically transmitted to the participating entities.

Figure 7:
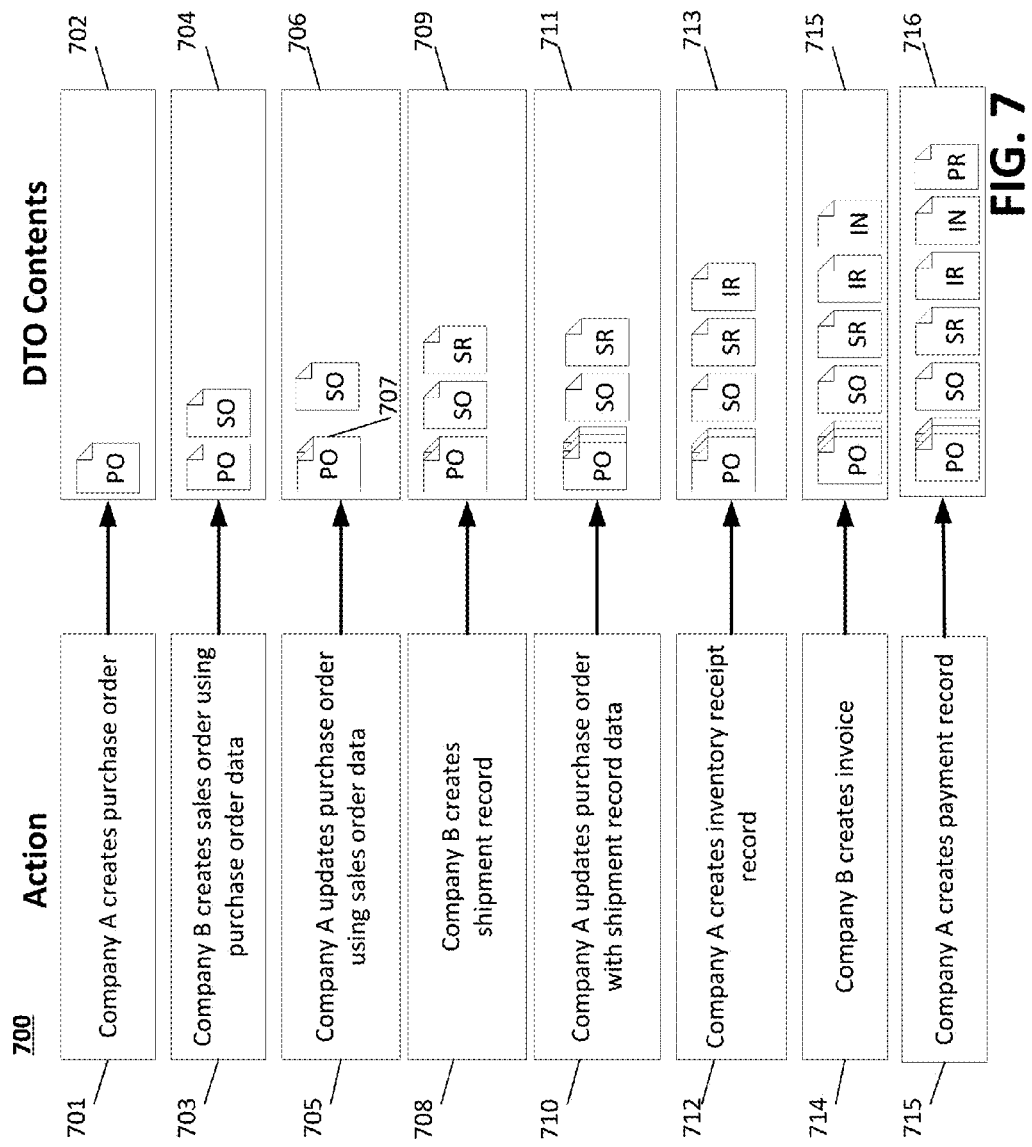
FIG. 7 is a flow diagram illustrating the contents of the DTO being described in this non-limiting example as the participating entities access and modify it during an exemplary business transaction.

FIG. 7 is a flow diagram illustrating the contents of the DTO being described in this non-limiting example as the participating entities access and modify it during an exemplary business transaction. At the onset, as described above, a business transaction has been initiated by creating a purchase order. At action 701, a DTO is created based on the purchase order created by Company A as reflected in DTO Contents block 702. As described above, a new record is then created. At action 703, Company B, upon receiving the purchase order from Company A, creates a sales order using the purchase order data. The DTO contents are modified as reflected in DTO Contents block 704 to create the sales order. As the example scenario progresses, the contents of the DTO are illustrated in FIG. 7.

Because all the records associated with a transaction are linked by the DTO, users can easily update records linked by the object with data from other records linked by the object. For example, when the Company A user sees the modified object from Company B, the user chooses to update the Purchase Order record with data from Company B's Sales Order at action 705. As a result, the DTO contents of the purchase order are modified as reflected in DTO Contents block 706. In this step, an existing object is modified—the object representing the Purchase Order. Instead of creating a new object representing the modification, the Purchase Order object is simply referenced as in 707, since a DTO byte stream can contain only one copy of an object.

Users from one entity can modify the DTO in ways that do not necessarily require action by the other entity or entities. In our non-limiting example, if the Company B user sees that Company A has updated its Purchase Order, there is no need to do anything in response; however, Company B may opt to modify the Sales Order accordingly.

When the Company B user ships the items identified in Company A's Purchase Order, the user creates a new record—a Shipment Entry—in Company B's system at action 708. Action 708 then modifies the DTO as reflected in DTO Contents block 709 where the Shipment Record now appears. The Company A user may update the Purchase Order with data from the Shipment Entry. Thus, at action 710, the Company A user modifies the DTO by referencing the Purchase Order again as reflected in DTO Contents block 711.

Because all the records associated with a transaction are linked by the DTO, users can easily verify the status of the entire transaction. When the Company A user receives the shipment of items in the Purchase Order, the user documents it by creating an Inventory Receipt record. Thus, in action 712 the user modifies the DTO as reflected in DTO Contents block 713.

When the user at Company B sees that the shipment has been received, the user creates an Invoice for Company A at action 714. In this process, the user from Company B modifies the DTO as reflected in DTO Contents block 715 where the invoice now appears. The Company A user pays the invoice at action 716 and creates an AP Payment record as reflected in DTO Contents block 717.

Figure 8:
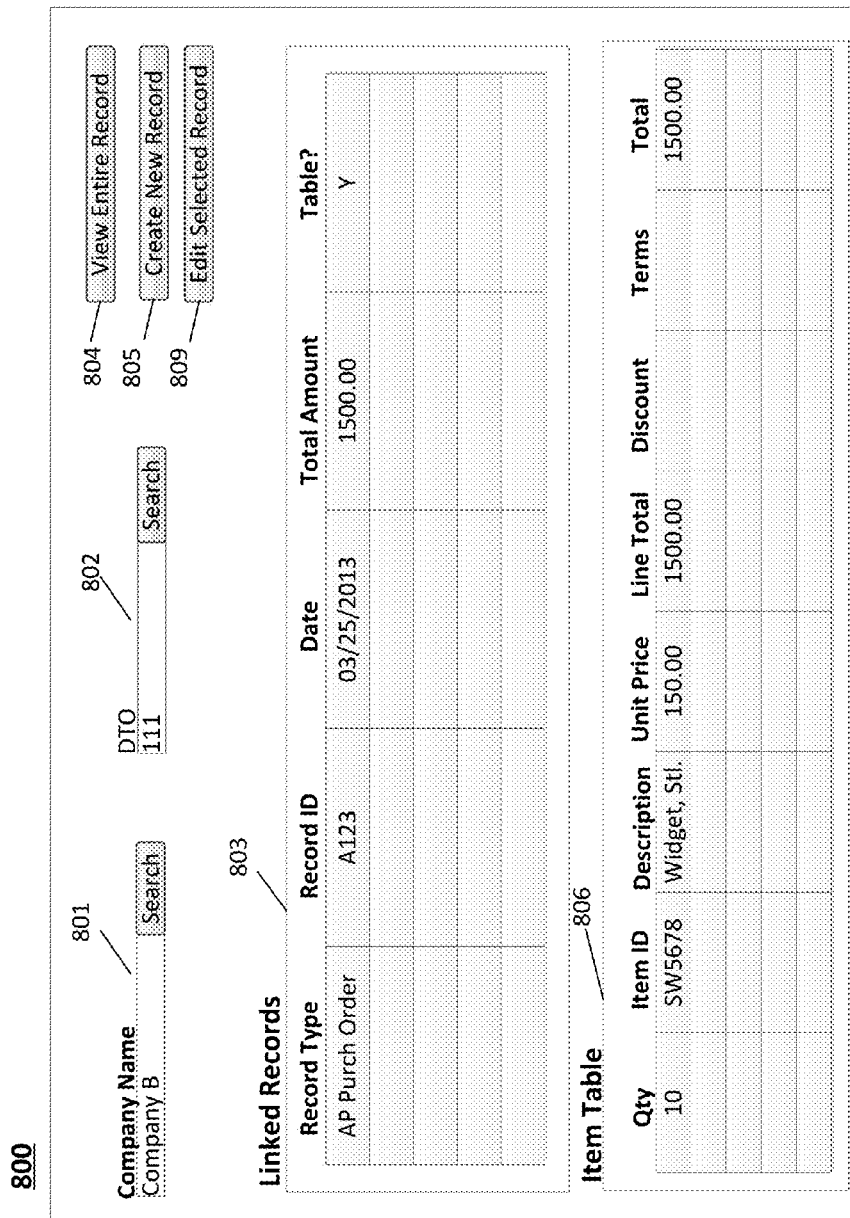
FIG. 8 is an exemplary screen of a conceptual user interface for accessing, creating, and modifying DTOs relating to cross-company verification.

FIG. 8 is an exemplary screen of a conceptual user interface for accessing, creating, and modifying DTOs relating to the secure data exchange technique. It should be appreciated that this is a non-limiting example of a conceptual user interface, and as such, all elements depicted in this figure are non-limiting examples as well. The exemplary screen includes controls, tables, rows, columns, fields, labels, links, and a variety of other elements; the configuration, placement, grouping, size, arrangement, or combination of elements; and all other concepts or elements depicted in this figure.

The user selects the desired company via Company Name search dialog 801, and the desired DTO via DTO search dialog 802. Alternatively, the user can utilize DTO search dialog 802 without using a Company Name search dialog 801, since each DTO will typically have a unique identifier.

Once the DTO is selected, a list of the records comprising it is displayed in Linked Records table 803. Each row contains information for one record. A record can be selected by clicking on its corresponding row in the table. If the selected record includes an item table, the contents of the item table display in Item Table 806. The entire contents of the selected record are displayed by clicking View Entire Record button 804. The selected record can be accessed and edited by clicking Edit Selected Record button 809. In an exemplary embodiment, a participating entity can only edit records it originated; it cannot edit records it did not originate; however, in some embodiments it will be appreciated that certain editing functions may be included. A new record can be created by clicking Create New Record button 805. Records created in this manner are linked to the DTO being viewed.

What is claimed is:

1. A processor implemented method of securely exchanging accounting data between a first digital general ledger stored and managed via a first client-server system and a second digital general ledger stored and managed via a second client-server system, the first client-server system operating independently and securely on an objected-oriented platform, the second client-server system operating independently and securely on an object-oriented platform, the method comprising the acts of:

providing an object-oriented application programming interface for a first client-server system and a second client-server system;

receiving a data input related to a transaction, the transaction necessitating an update to at least a first digital general ledger stored, at least in part, on a database corresponding to the first client-server system;

associating the update to the first digital general ledger with a second digital general ledger stored, at least in part, on a database corresponding to the second client-server system;

building a first data transfer object, on the first client-server system, corresponding to the update to the first digital general ledger, the first data transfer object configured to operate on the object-oriented application programming interface and to leverage the means specified by the object-oriented application programming interface;

encrypting the first data transfer object, at a server tier of the first client-server system, such that access is restricted to the first client-server system, the second client-server system, and to any other client-server system associated with the update to the first digital general ledger by restricting access to a corresponding encryption routine such that a client tier of the first client-server system cannot access the corresponding encryption routine;

alerting the second client-server system of the first data transfer object;

transmitting, to a server tier of the second client-server system, the first data transfer object such that the second digital general ledger can be updated based at least in part on the update to the first digital general ledger; and building a second data transfer object, on the second client-server system, the second data transfer object corresponding to an update to the second digital general ledger, based at least in part on the update to the first digital general ledger, and referencing the first data transfer object, the second data transfer object configured to operate on the object-oriented application programming interface and to leverage the means specified by the object-oriented application programming interface;

wherein, the processor implemented method has the proviso that any transmitting of the first data transfer object or second data transfer object, between the first client-server system and the second client-server system does not involve a remote-user connection between any of the client tier or the server tier of either the first client-server system or the second client-server system.

2. The processor implemented method of claim 1, wherein the act of receiving a data input related to a transaction comprises the act of receiving data for a record type that is at least a part of the first digital general ledger.

3. The processor implemented method of claim 2, wherein the act of associating the update to the first digital general ledger with a second digital general ledger comprises the act of querying other digital general ledgers for a record type that is related, based at least on accounting principles, to the record type of the received data of the act of receiving a data input related to a transaction.

4. The processor implemented method of claim 1, wherein the act of receiving a data input related to a transaction comprises the act of receiving data that facilitates associating the update to the first digital general ledger with another digital general ledger.

5. The processor implemented method of claim 4, wherein the act of receiving data that facilitates associating the update to the first digital general ledger with another digital general ledger comprises the act of receiving an identifier of a client corresponding to the second client-server system.

6. The processor implemented method of claim 5, wherein the act of transmitting the first data transfer object to the server tier of the second client-server system comprises the act of making available a corresponding de-encryption routine to the server tier of the second client-server system and restricting access to the corresponding de-encryption routine such that a client tier of the second client-server system cannot access the corresponding de-encryption routine.

7. A system for securely exchanging accounting data between a first digital general ledger stored and managed via a first client-server system and a second digital general ledger stored and managed via a second client-server system, the system comprising:
  a database
  a client; and
  a server built on a system comprising:
    a memory element; and
    a processor communicatively coupled to the memory element, the database, and the client, the processor, in response to executing program instructions contained in the memory element, being configured to:
      provide an object-oriented application programming interface;
      receive a data input related to a transaction, the transaction necessitating an update to at least a first digital general ledger stored, at least in part, on a database corresponding to the first client-server system;
      associate an update to the first digital general ledger stored, at least in part, on the database with a second digital general ledger stored, at least in part, on a database corresponding to the second client-server system;
      build a first data transfer object corresponding to the update to the first digital general ledger, the first data transfer object configured to operate on the object-oriented application programming interface and to leverage the means specified by the object-oriented application programming interface;
      encrypt the first data transfer object such that access is restricted to the first client-server system, the second client-server system, and to any other client-server system associated with the update to the first digital general ledger;
      alert the second client-server system of the first data transfer object;
      make available, to a server tier of the second client-server system, the first data transfer object such that the second digital general ledger can be updated based at least in part on the update to the first digital general ledger; and
      receive notice of a second data transfer object built by the second client-server system, the second data transfer object corresponding to an update to the second digital general ledger, based at least in part on the update to the first digital general ledger, and referencing the first data transfer object, the second data transfer object configured to operate on the object-oriented application programming interface and to leverage the means specified by the object-oriented application programming interface;
        with the proviso that any transmission of the first data transfer object or second data transfer object, between the first client-server system and the second client-server system does not involve a remote-user connection between any of the client tier or the server tier of either the first client-server system or the second client-server system;

restrict access to an encryption routine that encrypts the first data transfer object such that a client tier of the first client-server system cannot access the corresponding encryption routine;

wherein the first client-server system operates independently and securely on an objected-oriented platform, and the second client-server system operates independently and securely on an object-oriented platform.

8. The system of claim 7, wherein the processor of the server is additionally configured to receive data for an accounting record type that is at least a part of the first digital general ledger, the received data necessitating an update to at least the first digital general ledger.

9. The system of claim 8, wherein the processor of the server is additionally configured to query other digital general ledgers for a record type that is related to the accounting record type based at least in part on a common accounting link.

10. The system claim 7, wherein the processor of the server is additionally configured to:

make available a corresponding de-encryption routine to the server tier of the second client-server system; and restrict access to the corresponding de-encryption routine such that a client tier of the second client-server system cannot access the corresponding de-encryption routine.

* * * * *